No. 827,556. PATENTED JULY 31, 1906.
F. E. NEWCOMB.
VEHICLE TIRE.
APPLICATION FILED DEC. 9, 1905.
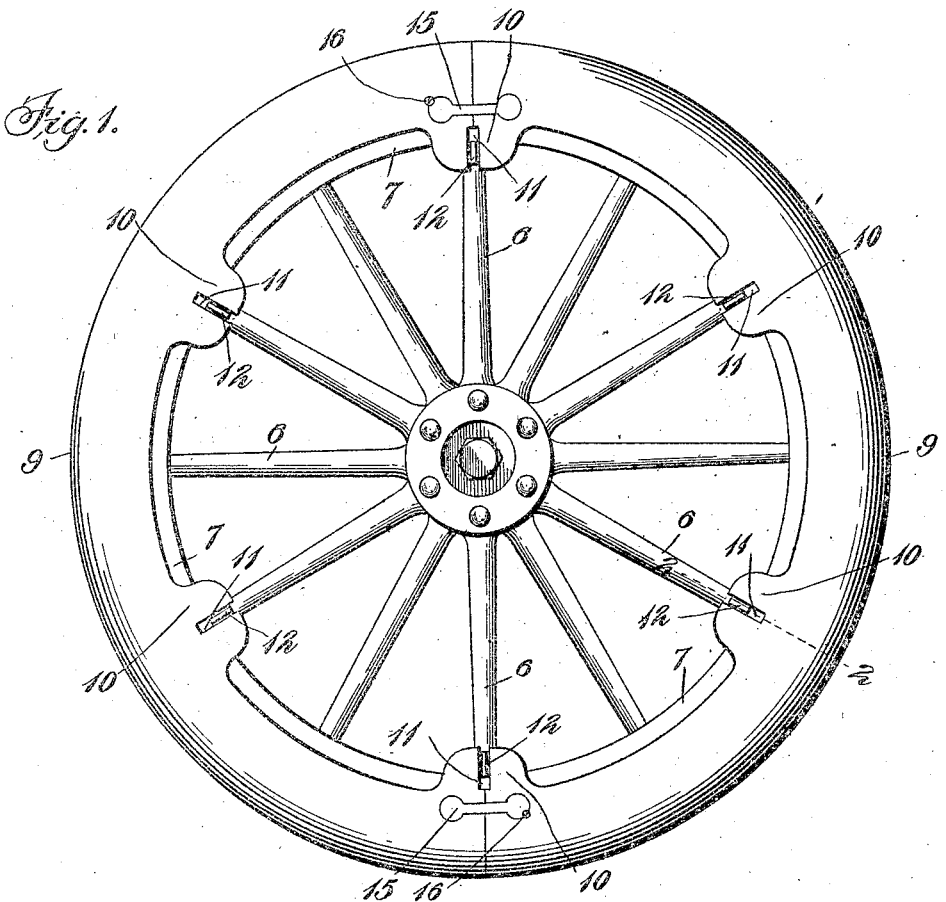
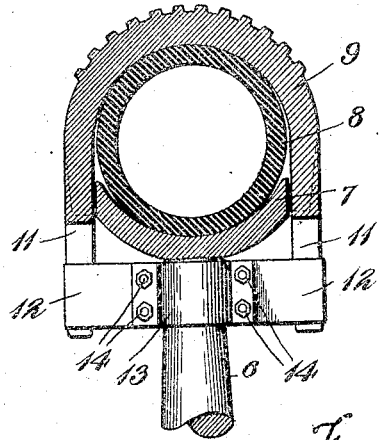
Inventor
Frank E. Newcomb,
By Milo B. Stevens & Co.
Attorneys.
Witnesses

UNITED STATES PATENT OFFICE.

FRANK E. NEWCOMB, OF CLEVELAND, OHIO.

VEHICLE-TIRE.

No. 827,556. Specification of Letters Patent. Patented July 31, 1906.

Application filed December 9, 1905. Serial No. 291,088.

*To all whom it may concern:*

Be it known that I, FRANK E. NEWCOMB, a citizen of the United States, residing at Cleveland, in the county of Cuyahoga and State of Ohio, have invented new and useful Improvements in Vehicle-Tires, of which the following is a specification.

This invention relates to vehicle-tires, and is particularly adapted for use on motor or traction vehicles in which the wheels take the driving strain.

The object of the invention is to provide a wheel with a pneumatic or cushion tire covered by a metal rim which acts as armor for the tire and also relieves the same of the tangential or driving strain, so that the pneumatic tube is subjected to no other strain than that due to the weight of the vehicle and the nature of the road. The connection between the rim and the wheel is a yielding one, so that the driving, starting, or stopping strains on the wheels are cushioned to some extent.

The invention is illustrated in the accompanying drawings, in which—

Figure 1 is a side elevation of the wheel, and Fig. 2 is a section on the line 2 2 of Fig. 1.

Referring specifically to the drawings, 6 indicates the spokes of the wheel, joined to a felly 7, which is channeled or concave, as shown in the sectional view, and receives the pneumatic tube 8. A solid rubber tire may be substituted for the tube, if so desired; but I consider the pneumatic tube preferable. The felly is preferably made of metal.

The rim consists of a metallic ring preferably formed in two sections 9, which meet at the ends at a diametrical line. This rim is substantially semicircular in cross-section, being convex on the outside and concave on the inside to fit over the tube 8, and it extends inwardly on each side or edge of the felly 7, the contact with the edges of the rim being a sliding one, so that a yielding radial movement is permitted. At intervals, preferably every second spoke, the rim has a pair of inwardly-projecting lugs 10 on each side, the radial slots or spaces 11 between the lugs being of proper size and shape to receive metal spring-bars 12, which are clamped to the spokes by clips 13 and bolts 14, and the opposite ends of which extend a sufficient distance to project into the slots on the opposite sides of the tire. These springs are sufficiently stout to stand the strain, but will nevertheless yield to accommodate sudden strain, as in starting or stopping. They transmit the driving strain from the spokes to the rim.

The rim-sections are connected together at their meeting ends by fasteners 15, consisting of double-headed steel bars, which are let into appropriate recesses in the rim-sections and extend across the joint and are held in place by screws 16.

Any side pressure is transmitted directly from the rim 9 to the felly 7. The tangential or driving strain is transmitted from the spokes through the springs 12 to the rim-sections. The slots 11 allow the rim-sections to yield inwardly to the extent due to the weight of the vehicle and to shocks incident to obstructions in the road, so that the resilient action of the tube 8 is not interfered with.

The tire or tube is held in place by its inclosure within the rim and is not fastened thereto. The driving strain is not transmitted through the tube, but is transmitted directly from the wheel center to the rim. There is no wear on the rubber such as that ordinarily due to its contact with the road, and the rim forms an armor which renders the tube puncture-proof. There is therefore the advantage of a resilient or pneumatic tire which is made puncture-proof without any diminution of its resiliency, since the spring 12 allows the rim to yield when the tube 8 is compressed thereunder; also, the advantage of a more positive drive than that afforded by the contact of rubber with the road or pavement. The metal rim is preferably corrugated, as shown, on the outer side to prevent slip. Since the rubber part is protected and almost all the wear is on metal parts, the life of the wheel is correspondingly lengthened.

I claim—

1. A vehicle-wheel having a felly and a resilient ring thereon, and an outer rim which forms an inclosing casing for said ring and extends inwardly on each side to lap the edges of the felly, and a spring driving connection between the body of the wheel and the said inwardly-extending portion of the rim, allowing the latter to yield to tangential strain, said connection being independent of the resilient member.

2. A vehicle-wheel having an outer rim with inwardly-extending projections with slots therebetween, a resilient supporting member under the rim, permitting it to yield radially, and cross-bars secured to the wheel and extending at their ends into the slots, to transmit the tangential strain.

3. A vehicle-wheel having an outer rim with pairs of inwardly-projecting lugs on opposite sides thereof, the lugs having slots therebetween, a resilient supporting member under the rim, permitting it to yield radially, and spring cross-bars connected to the spokes of the wheels and projecting at their ends into the slots, to transmit the tangential strain.

4. A vehicle-wheel having a felly with a concave face, a pneumatic tube thereon, an outer metal casing over the tube, formed of sections rigidly connected together, and which laps the edges of the felly and has inwardly-extending projections with slots therebetween, and spring cross-bars fastened to the spokes of the wheel and extending at their ends into the slots.

In testimony whereof I have signed my name to this specification in the presence of two subscribing witnesses.

FRANK E. NEWCOMB.

Witnesses:
JOHN A. BOMMHARDT,
SHIRLEY BOMMHARDT.